US010253401B2

(12) United States Patent
Meyer et al.

(10) Patent No.: US 10,253,401 B2
(45) Date of Patent: Apr. 9, 2019

(54) METHOD FOR RELIEVING RESIDUAL STRESS IN CAST-IN-PLACE LINERS OF HPDC ENGINE BLOCKS

(71) Applicant: GM GLOBAL TECHNOLOGY OPERATIONS LLC, Detroit, MI (US)

(72) Inventors: Maurice G Meyer, Fenton, MI (US); Qigui Wang, Rochester Hills, MI (US); Jianghuai Yang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 287 days.

(21) Appl. No.: 15/267,673

(22) Filed: Sep. 16, 2016

(65) Prior Publication Data

US 2018/0080107 A1 Mar. 22, 2018

(51) Int. Cl.
| | |
|---|---|
| C21D 1/30 | (2006.01) |
| C21D 1/42 | (2006.01) |
| C22F 1/04 | (2006.01) |
| F02F 1/00 | (2006.01) |
| F02F 1/18 | (2006.01) |
| F02F 7/00 | (2006.01) |
| H05B 6/06 | (2006.01) |
| H05B 6/10 | (2006.01) |
| C21D 1/613 | (2006.01) |

(52) U.S. Cl.
CPC .............. *C22F 1/04* (2013.01); *C21D 1/30* (2013.01); *C21D 1/42* (2013.01); *C21D 1/613* (2013.01); *F02F 1/004* (2013.01); *F02F 1/18* (2013.01); *H05B 6/06* (2013.01); *H05B 6/101* (2013.01); *F02F 7/0085* (2013.01); *F02F 2200/06* (2013.01)

(58) Field of Classification Search
CPC .... C22F 1/04; C21D 1/30; C21D 1/42; C21D 1/613; C21D 1/60; F02F 1/004; F02F 2001/008; F02F 2200/06
See application file for complete search history.

(56) References Cited

U.S. PATENT DOCUMENTS 8,214,182 B2 * 7/2012 Wang ................. G06F 17/5018
700/145
2015/0356402 A1 * 12/2015 Wang ....................... C22F 1/04
706/21

* cited by examiner

*Primary Examiner* — C Melissa Koslow

(57) ABSTRACT

A method for relieving residual stress in cast-in-place liners of high pressure die cast (HPDC) engine blocks to prevent cracking in the liners during the machining process. The method includes locally heating up the liners and the surrounding engine block material through rapid induction heating and then cooling down the liners and surrounding engine block material with still ambient air to a predetermined temperature after the residual stress has been reduced to a desired threshold.

10 Claims, 3 Drawing Sheets

METHOD FOR RELIEVING RESIDUAL STRESS IN CAST-IN-PLACE LINERS OF HPDC ENGINE BLOCKS

FIELD

Apparatuses consistent with exemplary embodiments relate to a method for relieving residual stress in high pressure die cast (HPDC) engine blocks before machining. More particularly, apparatuses consistent with exemplary embodiments relate to a method for relieving residual stress in cast-in-place liners of high pressure die cast (HPDC) engine blocks.

BACKGROUND

Because of rapid cooling and particularly non-uniform cooling in the high pressure die casting process, a significant amount of residual stress can be developed in HPDC engine parts. With cast-in-place liners, even more residual stress is produced in the liners and surrounding aluminum.

High stresses in the liners at the interbore areas can cause cracking during post-cast machining and durability testing. Conventional lower temperature ageing heat treatment post HPDC to strengthen the aluminum alloy blocks has proven to produce little effect of relieving the cast residual stress. In some cases, liners made from high strength/high durability materials are used to avoid the cracking and fracturing that frequently occurs during machining or testing as a result of residual stresses in the parts after the HPDC process.

It is appreciated that the use of high strength/high durability materials is effective in mitigating the issues resulting from residual stresses affecting cast-in-place liners after the HPDC engine process, this approach is known to be costly, harder to machine, and can reduce fuel efficiency due to increased material weight. As such, aspects of the following exemplary method provides an alternative approach that addresses the issues associated with post-HPDC residual stresses while avoiding the concerns that arise with using high strength/high durability material liners.

SUMMARY

One or more exemplary embodiments address the above issue by providing a method for relieving residual stress in high pressure die cast (HPDC) engine blocks. More particularly, apparatuses consistent with exemplary embodiments relate to a method for relieving residual stress in cast-in-place liners of high pressure die cast (HPDC) engine blocks before machining. According to an aspect of an exemplary embodiment, a method of relieving residual stress in a cast-in-place liner of a high pressure die cast engine before machining includes calculating a temperature profile of at least one liner and engine block material surrounding the at least one liner based on material thermoplastic and mechanical properties.

Further aspects include inductively heating the at least one liner and engine block material surrounding the at least one liner, and controlling the inductive heating to obtain the calculated temperature profile of the at least one liner and engine block material surrounding the at least one liner. Another aspect of the exemplary embodiment includes uniformly cooling the at least one liner and engine block material surrounding the at least one liner to a predetermined temperature when a relaxed residual stress is less than or equal to a predetermined relaxed residual stress threshold.

Still further aspects include controlling the inductive heating through at least one adjustable heating path, and calculating a residual stress relaxation of the at least one liner and the engine block material surrounding the at least one liner in response to the inductive heating. Yet another aspect of the exemplary embodiment includes calculating a heating up rate of the at least one liner and the block material surrounding the at least one liner based on the calculated temperature profile. Still another aspect includes measuring the relaxed residual stress of the at least one liner and the engine block material surrounding the at least one liner.

Another aspect of the exemplary embodiment includes determining the at least one adjustable heating path based on an as-cast residual stress distribution of the at least one liner and the engine block material surrounding the at least one liner.

Other objects, advantages and novel features of the exemplary embodiments will become more apparent from the following detailed description of exemplary embodiments and the accompanying drawings.

BRIEF DESCRIPTION OF THE DRAWINGS

The present invention will be better understood from the description as set forth hereinafter, with reference to the accompanying drawings, in which.

DETAILED DESCRIPTION OF THE INVENTION

Figure 1:
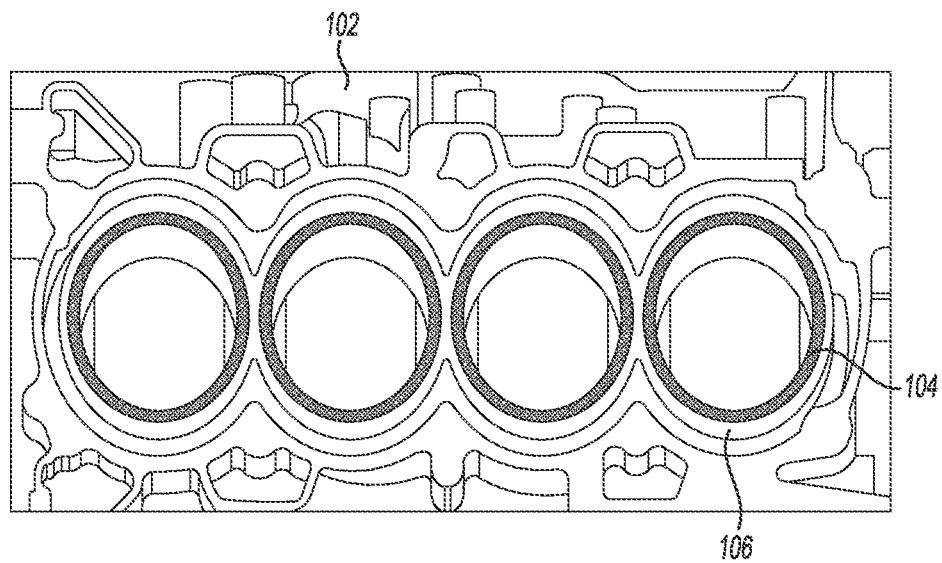
FIG. 1 is an illustration of an open deck high pressure die cast (HPDC) engine block including cast-in-place liners in accordance with an exemplary embodiment.

The following description is merely exemplary in nature and is not intended to limit the present disclosure, application, or uses. FIG. 1 provides an illustration of an open deck HPDC engine block 102 including cast-in-place liners 104 with engine block material 106 surrounding the cast-in-place liners 104 in accordance with aspects of an exemplary embodiment. In the exemplary embodiment, the engine block 102 is made of aluminum (AL) or an aluminum alloy materials such as, but not limited to, A360, A380, or A390. The cast-in-place liners 104 may be made from cast iron, steel, or various cast iron or steel alloys. In the casting process, the liners 104 are held in place by mandrels at locations that will form the inside surface of the engine's 102 piston cylinders. After the molten metal engine block material is poured and allowed to solidify, the liners become part of the engine block.

Residual stress in the liners 104 and engine block material 106 surrounding the liners is developed due to differences in the respective material's thermal expansion or contraction coefficients. Roughly, aluminum expands or contracts about 8 times that of cast iron liners. The differences in the thermal expansion or contraction coefficients cause uneven temperature distribution in the HPDC engine 102 during the manufacturing process, primarily due to the casting and cooling of the different materials used such as cast iron liners and surrounding aluminum engine block. High tensile residual stress in the liners 104 can cause cracking and fractures when the residual stress is greater than liner tensile strength.

Figure 2A:
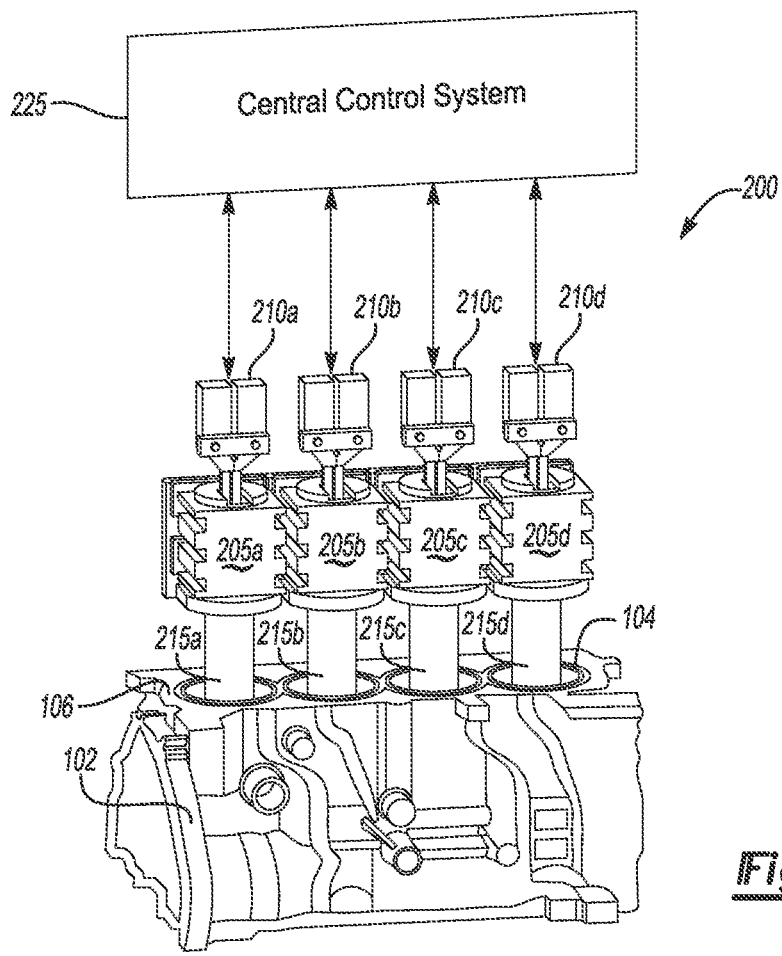
FIG. 2A is an illustration of an inductive heating apparatus positioned for heating the cast-in-place liners of the HPDC engine block in accordance with an exemplary embodiment.

Referring now to FIG. 2A, an illustration of an inductive heating apparatus 200 arranged for heating the cast-in-place liners 104 of the HPDC engine block 102 in accordance with an exemplary embodiment is provided. The inductive heating apparatus 200 includes power signal circuits 210a 210b, 210c, and 210d for providing a power signal to heating control units 205a, 205b, 205c, and 205d which controls the inductive heating distribution (including heating up rate, adjustable heating path, and temperature profile) in the inductive heating elements 215a, 215b, 215c, and 215d. A central system 225 that is operative to manage, command, direct and regulate the functions of the inductive heating apparatus 200 as according to aspects of the exemplary embodiment. It is appreciated that the central control system 225 can be either an open or closed loop system. For an open system, a detailed calibration needs to be done to optimize the heating up time and the applied power. For a closed loop system, temperature sensing units (not shown) would be employed proximately to the cast-in-place liners 104 and the engine block material 106 surrounding the liners 104 to provide a real-time temperature signal back to the heating control units 205a-205d which control the heating up rate, adjustable heating path, and temperature profile.

Figure 2B:
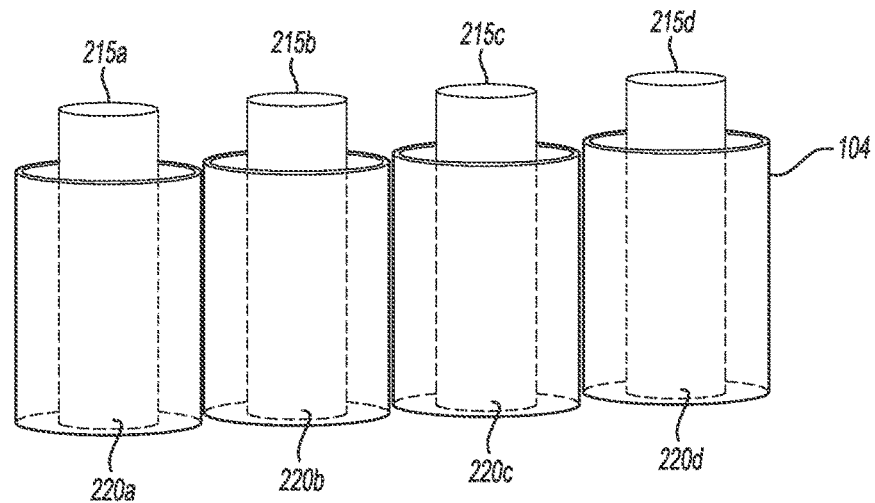
FIG. 2B is an illustration of a muted view of a plurality of adjustable-path heating coils arranged within the cast-in-place liners in accordance with an exemplary embodiment.

FIG. 2B provides an illustration of a muted view of a plurality of adjustable-path heating coils 220a, 22b, 220c, and 220d disposed within the inductive heating elements 215a-215d when positioned within the cast-in-place liners 104 in accordance with an exemplary embodiment. It is appreciated that the adjustable-path heating coos are operative to be selectively controlled by heating control units 210a-210d to inductively heat any fraction of or entire body of the cast-in-place liner 104 and engine block material 106 surrounding the cast-in-place liner 104 as according to aspects of the exemplary embodiment.

Figure 3:
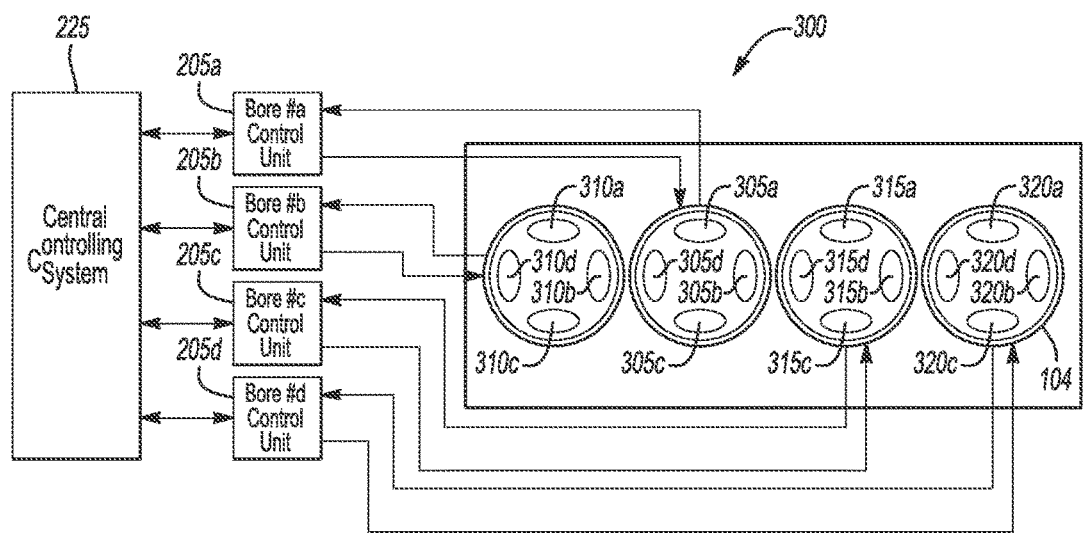
FIG. 3 an illustration of schematic view of the central control system, the heating control units, and the adjustable-path heating coils of the inductive heating apparatus in accordance with the exemplary embodiment.

FIG. 3 is an illustration of schematic view 300 of the central control system 225, the heating control units 205a-205d, and the adjustable-path heating coils 305a-305d, 310a-310d, 315a-315d, and 320a-320d of the inductive heating apparatus 200 in accordance with the exemplary embodiment. As illustrated, each inductive heating element 215a-215d may consist of a plurality of adjustable heating coils 220a-220d.

In the exemplary embodiment, each inductive heating element 215a-215d includes 4 adjustable heating coils 220a-220d wherein each adjustable heating coil is operative to heat one quarter of the cast-in-place-liner 104 and the engine block material 106 (not shown) surrounding the liners 104. The heating up rate, heating path, and temperature profile of each cast-in-place liner 104 and engine block material 106 can be adjusted by the central control system 225 or the respective control units 205a-205d as each coil is wired separately for independent control.

Thus, each bore can be variably heated at a desired temperature, in a sequential manner or at the same time, for different periods of time, and through independent adjustable heating paths 220a-220d as according to a temperature profile to be obtained.

Figure 4:
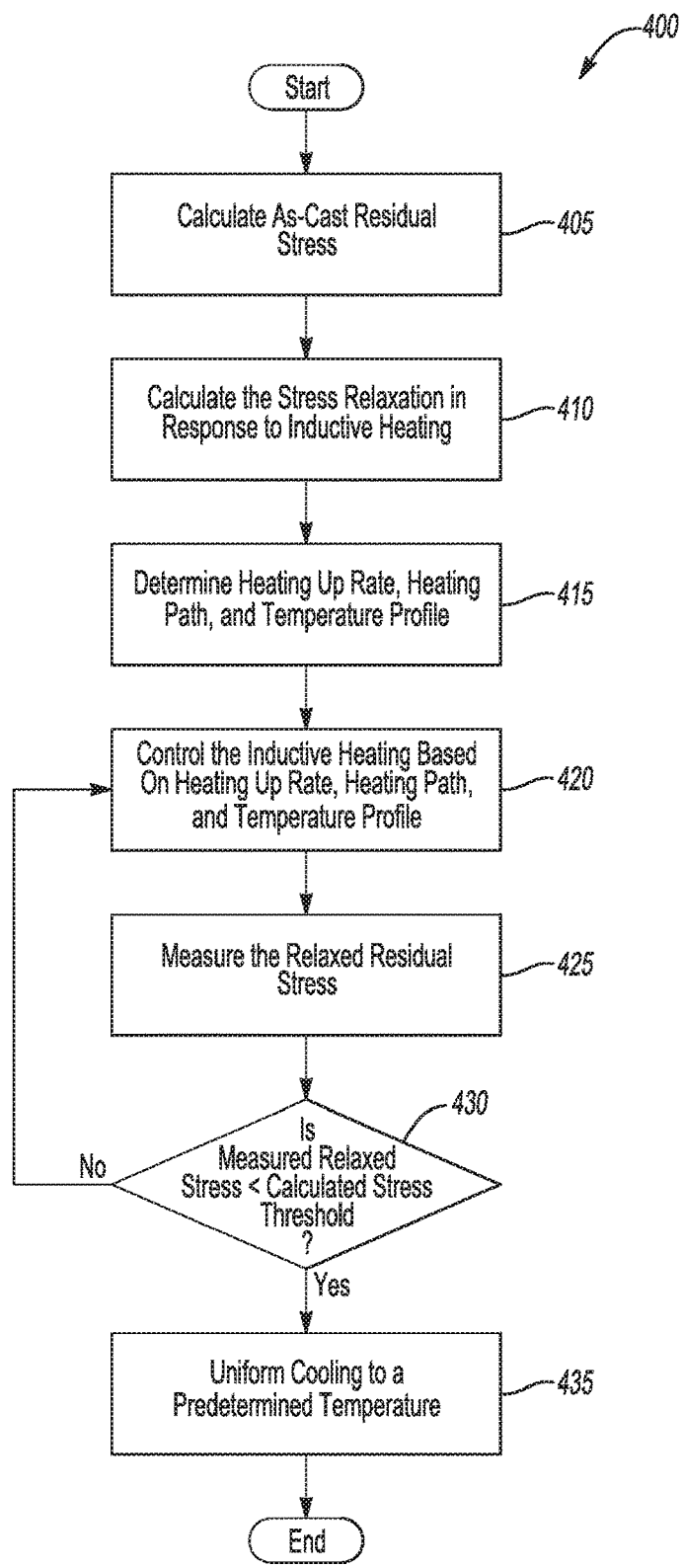
FIG. 4 is an illustration of a flow diagram of an algorithm for relieving residual stress in cast-in-place liners of (HPDC) engine blocks.

Referring now to FIG. 4, an illustration of a flow diagram of an algorithm 400 of the method for relieving residual stress in cast-in-place liners of (HPDC) engine blocks before machining is provided. At block 405, the method begins with calculating the residual stress of the at least one cast-in-place liner 104 and the engine block material 106 surrounding the liner. This includes determining the initial temperatures of the melted engine block material and the casting die to be filled. Thereafter, thermal analysis is performed on the filling of the mold, the solidification of the molten material, and the cooling down process as accomplished by air or liquid quenching. The relevant calculations for thermal analysis are as follows: During mold filling, the heat transfer of moving liquid metal can be calculated using:

$$\frac{\partial H}{\partial t} + \nabla \cdot Hv = k\nabla^2 T,$$

where the enthalpy, $H = \int \rho c_p dT$. During solidification, the heat transfer of a solidifying aluminum casting follows the energy equation and can be simplified as:

$$\frac{\partial(\rho C_p T)}{\partial t} = -\nabla \cdot (\rho v C_p T) + \nabla(k\nabla T) - \rho L \frac{\partial f_l}{\partial t}$$

where $\rho$ is the density (kg/m$^3$); $C_p$ is the specific heat (J·kg$^{-1}$·K$^{-1}$); T is the temperature (K); v is the velocity vector (m·s$^{-1}$), L is the latent heat (J·kg$^{-1}$); and k is the thermal conductivity (W·m$^{-1}$·K$^{-1}$).

The thermal analysis results are further used to determine the nodal residual stress distribution within the at least one cast-in-place liner 104 and the engine block material 106 surrounding the liner as according to aspects of the exemplary embodiment.

At block 410, the method continues with calculating the stress relaxation of the at least one cast-in-place liner 104 and the engine block material 106 surrounding the liner in response to inductive heating. The as-cast residual stress distribution values are used in a finite element analysis simulation of inductive heating to determine the stress relaxation of the at least one cast-in-place liner 104 and the engine block material 106 surrounding the liner. The equations used are as follows as according to the exemplary embodiment. The total strain, due to temperature difference in the casting may be determined from intrinsic strength $\hat{\sigma}_e$, and strain hardening $\hat{\sigma}_p$.

$$\frac{\sigma}{\mu(T)} = C_e(\dot{\varepsilon}, T)\frac{\hat{\sigma}_e}{\mu_0} + C_p(\dot{\varepsilon}, T)\frac{\hat{\sigma}_p}{\mu_0}$$

where $C_e(\dot{\varepsilon},T)$, and $C_p(\dot{\varepsilon},T)$ are velocity-modified temperatures for intrinsic strength, and strain hardening, respectively; T is the temperature measured in Kelvin and $\dot{\varepsilon}$ is the strain rate; $\mu_0$ (=28.815 GPa) is a reference shear modulus value at 0 K and $\dot{\varepsilon} = 10^7$ s$^{-1}$ for the aluminum casting; and $\mu(T)$ is a temperature-dependent shear modulus. After yield, flow stress may be modeled through evolution of strain hardening $\hat{\sigma}_p$ $$\hat{\sigma}_p = \hat{\sigma}'_p + \frac{\mu(T)}{\mu_0}\theta_0\left[1 - \frac{\hat{\sigma}'_p}{\hat{\sigma}_{os}}\right]d\varepsilon$$

where $\theta_0$ represents the slope of the stress-strain curve at yield in the reference state (0 K, $\dot{\varepsilon}=10^7$ s$^{-1}$) and $\hat{\sigma}_{os}$ is a parameter of one of the material properties.

At block 415, the method continues with calculating a temperature profile and heating up rate of the at least one cast-in-place liner 104 and engine block material 106 surrounding the at least one liner 104 based on the material thermoplastic and mechanical properties of the at least one liner 104 and engine block 102.

As according to aspects of the exemplary embodiment, the engine block 102 is formed of aluminum or an aluminum alloy material and the liner(s) 104 are formed from cast iron. It is appreciated that these materials have different thermoplastic and mechanical properties but the temperature profile and heating up rate are primarily dependent on the engine block material such that incipient melting or blistering of the material is avoided. For example, the highest temperature of heating the aluminum engine block material 106 surrounding the cast iron liners 104 to avoid melting is between 400-500° C. at a heating up rate of 10-30° C./s while the highest temperature for heating cast iron before melting is between 1000-1100° C. at the same rate.

A slower heating up rate applies to low ductility aluminum materials, e.g., 10° C./s, and a faster heating up rate applies for high ductility materials, e.g., 30° C./s, wherein finite element analysis is used to determine the actual temperature profile and heating up rate as according to the below equations: $\sigma = E\alpha\Delta T < \sigma_{UTS}$, where $\sigma$ is thermal stress, E is Young's modulus, a is linear thermal expansion coefficient, $\Delta T$ is the change in temperature at a given time, $\sigma_{UTS}$ is the ultimate tensile strength of the engine block material. As according to aspects of the exemplary embodiment, a heating path is adjustable for heating the at least one cast-in-place liner 104 and engine block material 106 surrounding the liner to desired stress relaxation levels, particularly at the as-cast residual stress distribution nodes that are expected to be susceptible to fracturing/cracking during the machining process.

Referring now to block 420, the method continues with controlling the inductive heating based on the temperature profile, heating up rate, and heating path as required to obtain the desired stress relaxation levels in the at least one cast-in-place liner 104 and engine block material 106 surrounding the liner as according to aspects of the exemplary embodiment. It is appreciated that heating control is performed by the heating control units 205a-205d and the central control system 225 either by operation of a closed system that requires a sensing circuit for feedback (not shown), or open loop system which would require detailed calibration initially and periodically as part of equipment maintenance.

At block 425, the method continues with measuring the relaxed residual stress in response to inductive heating as according to an exemplary embodiment. Relaxed residual stress is measured by a destructive or non-destructive approach, but not limited to, strain gauge method, hole-drilling, X-ray diffraction, or neutron diffraction.

At block 430, the method continues by determining if the measured relaxed residual stress is less than or equal to a calculated relaxed residual stress threshold. If it is determined that the measured relaxed residual stress is less than or equal to the calculated relaxed stress threshold then the at least one cast-in-place liner 104 and engine block material 106 surrounding the liner is uniformly cooled down to a predetermined temperature. As according to aspects of the exemplary embodiment, the cooling down process will be naturally done in still ambient air but other methods such as forced ambient air, or forced warm air to achieve the predetermined temperature before machining. If the measured relaxed residual stress is not less than or equal to the calculated relaxed residual stress then the method returns to block 420 to further control the inductive heating until the measured relaxed residual stress is less than or equal to the calculated relaxed stress threshold.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of relieving residual stress in at least one cast-in-place liner of a high pressure die cast engine before machining comprising:
    calculating a temperature profile of at least one liner and engine block material surrounding the at least one liner based on material thermoplastic and mechanical properties;
    inductively heating the at least one liner and engine block material surrounding the at least one liner;
    controlling the inductive heating to obtain the calculated temperature profile of the at least one liner and engine block material surrounding the at least one liner; and
    uniformly cooling the at least one liner and engine block material surrounding the at least one liner to a predetermined temperature when a relaxed residual stress is less than or equal to a predetermined relaxed residual stress threshold.

2. The method of claim 1 wherein inductively heating further comprises controlling the inductive heating through at least one adjustable heating path.

3. The method of claim 1 further comprising calculating a residual stress relaxation of the at least one liner and the engine block material surrounding the at least one liner in response to the inductive heating.

4. The method of claim 1 wherein controlling inductive heating further comprises calculating a heating up rate of the at least one liner and engine block material surrounding the at least one liner based on the calculated temperature profile.

5. The method of claim 1 further comprising measuring the relaxed residual stress of the at least one liner and engine block material surrounding the at least one liner.

6. The method of claim 2 further comprising determining the at least one adjustable heating path based on an as cast residual stress distribution of the at least one liner and the engine block material surrounding the at least one liner.

7. A method of relieving residual stress in at least one cast-in-place liner of a high pressure die cast engine before machining comprising:
    calculating an as-cast residual stress distribution of the at least one and engine block material surrounding the at least one cast-in-place liner;
    calculating a heating up rate and a temperature profile of the at least one liner and engine block material surrounding the at least one liner based on material thermoplastic and mechanical properties;
    controlling inductive heating of the at least one liner and engine block material surrounding the at least one liner based on the heating up rate and the temperature profile;
    measuring a relaxed residual stress of the at least one liner and engine block material surrounding the at least liner; and
    uniformly cooling the at least one and engine block material surrounding the at least one liner to a predetermined temperature when the measured relaxed residual stress is less than or equal to the predetermined relaxed residual stress threshold.

8. The method of claim 7 wherein controlling inductive heating further comprises controlling inductive heating through at least one adjustable heating path based on the as-cast residual stress distribution of the at least one liner and engine block material surrounding the at least one liner.

9. The method of claim 7 wherein uniformly cooling further comprises cooling the at least one and engine block material surrounding the at least one liner in still ambient air.

10. The method of claim 7 wherein uniformly cooling further comprises cooling the at least one and engine block material surrounding the at least one liner in forced warm air.

* * * * *